(12) United States Patent
Mori et al.

(10) Patent No.: US 7,869,331 B2
(45) Date of Patent: Jan. 11, 2011

(54) OPTICAL HEAD, CONTROL METHOD FOR OPTICAL HEAD, AND OPTICAL INFORMATION PROCESSING APPARATUS

(75) Inventors: Eishin Mori, Kyoto (JP); Akihiro Arai, Kyoto (JP); Joji Anzai, Osaka (JP); Hideki Aikoh, Osaka (JP)

(73) Assignee: Panasonic Corporation, Osaka (JP)

( * ) Notice: Subject to any disclaimer, the term of this patent is extended or adjusted under 35 U.S.C. 154(b) by 294 days.

(21) Appl. No.: 12/279,061

(22) PCT Filed: Feb. 13, 2007

(86) PCT No.: PCT/JP2007/052467

§ 371 (c)(1),
(2), (4) Date: Aug. 12, 2008

(87) PCT Pub. No.: WO2007/094288

PCT Pub. Date: Aug. 23, 2007

(65) Prior Publication Data

US 2009/0135687 A1    May 28, 2009

(30) Foreign Application Priority Data

Feb. 14, 2006    (JP)    ................ 2006-036281

(51) Int. Cl.
*G11B 7/135*    (2006.01)
(52) U.S. Cl. ................................ 369/112.15
(58) Field of Classification Search .............. 369/112.1, 369/112.15
See application file for complete search history.

(56) References Cited

U.S. PATENT DOCUMENTS 5,062,098 A * 10/1991 Hori et al. .............. 369/112.02

(Continued)

FOREIGN PATENT DOCUMENTS

JP    60-010424 A    1/1985

(Continued)

OTHER PUBLICATIONS

International Search Report for International Application No. PCT/JP2007/052467 dated Mar. 13, 2007.

*Primary Examiner*—Peter Vincent Agustin
(74) *Attorney, Agent, or Firm*—RatnerPrestia

(57) ABSTRACT

An optical head includes a hologram which extracts, from a luminous flux of reflected light from an optical disk, at least a first luminous flux branch which does not include the optical axis of the luminous flux; and a photodetector which receives the reflected light from the optical disk and produces signal output, wherein the photodetector has light-receiving areas which receive the first luminous flux branch of reflected light from an optical information recording medium layer targeted for recording or playback out of the plurality of optical information recording medium layers of the optical disk, the light-receiving areas are placed in such a way that the signal output resulting from a light spot formed by the first luminous flux branch of the reflected light from the optical information recording medium layer targeted for recording or playback is practically the same between the first and second photodetection areas, and a boundary line of the light-receiving areas is located in such a position as not to include light spots formed by luminous fluxes of reflected light from the optical information recording medium layers other than the optical information recording medium layer targeted for recording or playback.

17 Claims, 14 Drawing Sheets

U.S. PATENT DOCUMENTS

| | | | |
|---|---|---|---|
| 5,416,765 A * | 5/1995 | Aikoh et al. | 369/112.12 |
| 6,084,840 A * | 7/2000 | Jang | 369/112.12 |
| 6,909,687 B2 * | 6/2005 | Mori et al. | 369/112.07 |
| 7,020,051 B2 * | 3/2006 | Kim et al. | 369/44.23 |
| 7,792,005 B2 * | 9/2010 | Sako | 369/112.05 |
| 2001/0001264 A1 * | 5/2001 | Tezuka et al. | 369/44.23 |
| 2002/0070328 A1 * | 6/2002 | Kimura et al. | 250/201.5 |
| 2004/0027939 A1 * | 2/2004 | Okada | 369/44.37 |
| 2005/0094510 A1 * | 5/2005 | Kim et al. | 369/44.37 |
| 2009/0135687 A1 * | 5/2009 | Mori et al. | 369/44.41 |

FOREIGN PATENT DOCUMENTS

| | | |
|---|---|---|
| JP | 60-038737 A | 2/1985 |
| JP | 4-372728 A | 12/1992 |
| JP | 5-250704 A | 9/1993 |
| JP | 6-251396 A | 9/1994 |
| JP | 07-073479 A | 3/1995 |
| JP | 2002-183987 A | 6/2002 |
| JP | 2005-346882 A | 12/2005 |
| JP | 2006-294204 A | 10/2006 |

* cited by examiner

OPTICAL HEAD, CONTROL METHOD FOR OPTICAL HEAD, AND OPTICAL INFORMATION PROCESSING APPARATUS

CROSS-REFERENCE TO RELATED APPLICATIONS

This application is a U.S. national phase application of PCT International Patent Application No. PCT/JP2007/052467 filed on Feb. 13, 2007, claiming the benefit of priority of Japanese Patent Application No. 2006-036281 filed on Feb. 14, 2006, all of which are incorporated by reference herein in their entirety.

TECHNICAL FIELD

The present invention relates to an optical head, optical information processing apparatus, and the like, where the optical head is used for recording and playback on/from an information recording medium such as an optical disk which has a plurality of optical information recording medium layers and the optical information processing apparatus is equipped with the optical head and performs recording and playback.

BACKGROUND ART

Recently, optical disks, which can record large amounts of information signals at high density, have come into use in many fields including audio, video, and computer fields. Today, when high-capacity, high-speed data transfer is becoming possible, greater packaging density is required in order to record large volumes of data such as moving-image information.

To achieve greater packaging density, there is no way but to reduce recording mark intervals and track pitches in the optical information recording medium layers. To perform reads and writes from and to an optical information recording medium with small recording mark intervals and a small track pitch, a minute laser spot is needed.

However, size of a laser spot (hereinafter referred to as a spot size) has a lower limit which depends on analysis limits, and it is not possible to reduce the spot size infinitely. Thus, an optical disk's in-plane recording density which depends on size of the recording marks or track pitch has a limit which in turn depends on the lower limit of the spot size.

To deal with this situation, there are attempts to increase information density per optical disk by increasing the number of optical information recording medium layers.

When information is read out of a multilayer optical disk using a conventional optical head, signal cross-talk may occur among the layers, resulting in large errors in a read signal. One of the causes of this is that focus position of laser light can deviate from a desired optical information recording medium layer.

A technique for eliminating disturbances in a focus error signal due to signal cross-talk is disclosed in Japanese Patent Laid-Open No. 2002-183987.

FIG. 11 is a diagram showing a configuration of such a conventional optical information recording medium and optical head. The configuration and operation will be described below with reference to FIG. 11.

Laser light emitted from a semiconductor laser 111 is converted into a parallel beam by a collimating lens 123, converted into a circular beam by a triangular prism 112, reflected by a polarizing beam splitter 131, converted into circularly polarized light by a quarter-wave plate 121, and then narrowed to a minute spot by an objective lens 141.

At focus position of the spot, a multilayer optical disk 1501 is rotating and reflected light with intensity variations is generated from optical information recording medium layers 1511, 1512, 1513, and the like which have recording marks. The reflected light returns to the objective lens 141. Then, the reflected light is converted into linearly polarized light by the quarter-wave plate 121 and transmitted through the polarizing beam splitter 131. The transmitted light is divided into two parts by a half prism 132. Reflected light from the half prism 132 is collected by a condensing lens 143 and directed onto a two-split photodetector 152 in order for electronic circuits 161 and 162 to generate a tracking error signal 172 and data signal 173.

Transmitted light from the half prism 132 is shielded by a knife edge 122, collected by a condensing lens 142, and directed onto a four-split photodetector 153. The four-split photodetector 153 includes four photodetection elements 1531, 1532, 1533, and 1534. If voltage outputs of the four photodetection elements 1531, 1532, 1533, and 1534 after current-voltage conversion are denoted by A, B, C, and D, respectively, an electronic circuit 164 performs signal processing such that the voltage outputs A, B, C, and D will satisfy the relationship E=A−B+C−D and thereby generates a focus error signal 171 which has a voltage output E.

As shown in FIG. 12, reflected light from that optical information recording medium layer 1512 of the multilayer optical disk 1501 on which the objective lens 141 is focused enters the two photodetection elements 1532 and 1533 in central part of the four-split photodetector 153 and forms a laser spot 181. The reflected light from the optical information recording medium layer 1512 which is in focus is designed to be collected and focused on a dividing line a between the photodetection elements 1532 and 1533 and enter the photodetection elements 1532 and 1533 in equal quantities so that the voltage outputs B and C generated from the two photodetection elements 1532 and 1533 after current-voltage conversion will be equal.

As shown in FIG. 13, reflected light from the optical information recording medium layer 1511 which is adjacent to the optical information recording medium layer 1512 enters the two photodetection elements 1533 and 1534 located in a lateral half of the four-split photodetector 153 and forms a laser spot 182. At this time, reflected light from the adjacent layer is designed to be focused on the left side of the dividing line a between the photodetection elements 1532 and 1533. Also, splitting position between the photodetection elements 1533 and 1534 is designed to be such that the laser spot 182 will enter the photodetection elements 1533 and 1534 in equal quantities and that the voltage outputs C and D generated from the photodetection elements 1533 and 1534 after current-voltage conversion will be equal.

This can be achieved, for example, by setting width L2 of each of the two inner photodetection elements 1532 and 1533 shorter than width L1 of each of the two outer photodetection elements 1531 and in a splitting direction among the four photodetection elements 1531, 1532, 1533, and 1534 of the four-split photodetector 153. Then, after the electronic circuit 164 performs signal processing such that the outputs of the four photodetection elements 1531, 1532, 1533, and 1534 of the four-split photodetector 153 will satisfy the relationship E=A−B+C−D to generate a focus error signal 171 which has a voltage output E, and to control a lens actuator 163 of the objective lens 141, it is possible to focus on a desired optical information recording medium layer without being affected by defocused reflected light from the adjacent optical information recording medium layers.

DISCLOSURE OF THE INVENTION

Problems to be Solved by the Invention

However, the technique described above for removing disturbances in a focus error signal with the conventional optical head has the following problem.

As shown in FIG. 14, in the configuration of the four-split photodetector 153, a laser spot 183 formed on the photodetection element 1533 is actually a result of superimposition of the reflected light (hereinafter referred to as reflected light 1) from the optical information recording medium layer 1511 and reflected light (hereinafter referred to as reflected light 2) from the optical information recording medium layer 1512.

At this time, in the laser spot 183, reflected light 1 and reflected light 2 are interfering with each other on the photodetection element 1533. Furthermore, surface movement resulting from rotation of the multilayer optical disk 1501 causes changes in light quantities of reflected lights 1 and 2, interference between which amplifies more changes in light quantity of the laser spot 183.

The changes in the light quantity of the laser spot 183 appear as variation in the focus error signal, getting out of the way of establishing focus position.

When the knife edge 122 shields incident light, the incident light is diffracted by an end face of the knife edge 122, causing reflected light 2 to also enter the photodetection element 1532 adjacent to the photodetection element 1533. The incident light on the photodetection element 1532 affects computations of the focus error signal.

The present invention has been made in view of the above problem and has an object to provide an optical head which can reduce disturbances in a focus error signal due to reflected light from optical information recording medium layers adjacent to a desired optical information recording medium layer as well as to provide an optical information processing apparatus which uses the optical head.

SUMMARY OF THE INVENTION

The $1^{st}$ aspect of the present invention is an optical head comprising:
a light source;
a condensing unit which collects light from the light source and directs the light onto an optical disk which has a plurality of optical information recording medium layers;
a luminous flux extracting unit which extracts, from a luminous flux of reflected light from the optical disk, at least a first luminous flux branch which does not include the optical axis of the luminous flux; and
a photodetection unit which receives the reflected light from the optical disk and produces signal output,
wherein the photodetection unit has first and second photodetection areas which receive the first luminous flux branch of reflected light from an optical information recording medium layer targeted for recording or playback out of the plurality of optical information recording medium layers of the optical disk, and
the first and second photodetection areas are divided by a boundary line which includes an intersecting point of the optical axis of the luminous flux of the reflected light from the optical disk and are located in such a position that a light spot formed by the first luminous flux branch of the reflected light from the optical information recording medium layer targeted for recording or playback is focused on the boundary line, and
the boundary line used to extract the first luminous flux branch in the luminous flux extracting unit is located at a distance d from a diametrical axis which includes the optical axis of the luminous flux in the luminous flux extracting unit so that the first luminous flux branch of reflected light from the layers other than the optical information recording medium layer targeted for recording or playback forms a light spot in such a position on the photodetection unit as not to overlap the first light spot.

The $19^{th}$ aspect of the present invention is the optical head according to the $1^{st}$ aspect of the present invention, wherein the signal output resulting from the light spot formed by the first luminous flux branch of the reflected light from the optical information recording medium layer targeted for recording or playback is the same between the first and second photodetection areas.

The $20^{th}$ aspect of the present invention is the optical head according to the $1^{st}$ aspect of the present invention, wherein
the luminous flux extracting unit extracts a second luminous flux branch or a plurality of second luminous flux branches including the optical axis of the luminous flux other than the first luminous flux branch from the luminous flux of the reflected light from the optical disk; and
the photodetection unit does not receive the second luminous flux branch or branches.

The $21^{st}$ aspect of the present invention is the optical head according to the $20^{th}$ aspect of the present invention, wherein
the luminous flux extracting unit has a first transparent surface and a second transparent surface divided by a straight line located at a distance d (d>0) from a diametrical axis which includes the optical axis of the reflected light from the optical disk;
the first luminous flux branch is produced by passage through the first transparent surface; and
the second luminous flux branch or branches are produced by passage through the second transparent surface.

The $22^{nd}$ aspect of the present invention is the optical head according to the $21^{st}$ aspect of the present invention, wherein the distance d satisfies:

$$d \leq (0.5 \times (D/2)) \qquad \text{(Formula 1)}$$

where D is flux diameter of reflected light which enters the luminous flux extracting unit.

The $23^{rd}$ aspect of the present invention The optical head according to the $1^{st}$ aspect of the present invention, wherein light-receiving areas of the first photodetection area and the second photodetection area are not equal in size.

The $24^{th}$ aspect of the present invention is the optical head according to the $1^{st}$ aspect of the present invention, wherein a focus error signal is generated based on a difference in signal output between the first photodetection area and the second photodetection area.

The $25^{th}$ aspect of the present invention is the optical head according to the $20^{th}$ aspect of the present invention, further comprising a sub-photodetection unit which receives the second luminous flux branch or branches, wherein
a tracking error signal is generated based on signal output from the sub-photodetection unit.

The $26^{th}$ aspect of the present invention The optical head according to the $1^{st}$ aspect of the present invention, wherein the number of optical information recording medium layers of the optical disk is three or more.

The $27^{th}$ aspect of the present invention The optical head according to the $1^{st}$ aspect of the present invention, wherein interlayer distance among the plurality of optical information recording medium layers is 40 μm or less.

The 28th aspect of the present invention is the optical head according to the 1st aspect of the present invention, wherein interlayer distance among the plurality of optical information recording medium layers is 25 μm or less and wavelength of the light source is 408 nm.

The 29th aspect of the present invention is the optical head according to the 1st aspect of the present invention, wherein the luminous flux extracting unit has a knife edge.

The 30th aspect of the present invention is the optical head according to the 20th aspect of the present invention, wherein the luminous flux extracting unit has a diffractive element.

The 31st aspect of the present invention is the optical head according to the 20th aspect of the present invention, wherein the luminous flux extracting unit has a prism.

The 32nd aspect of the present invention is a control method for an optical head, comprising:

a condensing step of collecting light from a light source and directing the light onto an optical disk which has a plurality of optical information recording medium layers;

a luminous flux extracting step of extracting, from a luminous flux of reflected light from the optical disk, at least a first luminous flux branch which does not include the optical axis of the luminous flux; and a photodetection step of receiving the reflected light from the optical disk and producing signal output, wherein the photodetection step includes a first and second photodetection steps of receiving the first luminous flux branch of reflected light from an optical information recording medium layer targeted for recording or playback out of the plurality of optical information recording medium layers of the optical disk, and the first and second photodetection steps operate, by dividing areas by a boundary line which includes an intersecting point of intersecting with the optical axis of the luminous flux of the reflected light from the optical disk, in such a position that a light spot formed by the first luminous flux branch of the reflected light from the optical information recording medium layer targeted for recording or playback will be focused on the boundary line.

The 33rd aspect of the present invention is the control method for an optical head according to the 32nd aspect of the present invention, wherein the light spot formed on the photodetection unit by the first luminous flux branch of the reflected light from the optical information recording medium layer targeted for recording or playback does not overlap each other a light spot formed on the photodetection unit by the first luminous flux branch of reflected light from the layers other than the optical information recording medium layer targeted for recording or playback.

The 34th aspect of the present invention is an optical information processing apparatus comprising:

an optical head which optically records and plays back information on/from an optical disk;

a rotation unit which rotationally drives the optical disk; and a control unit which controls the optical head; wherein the optical head is the optical head according to claim 1.

The optical head and optical information processing apparatus of the present invention offer the great advantage of reducing disturbances in the focus error signal due to the reflected light from the optical information recording medium layers adjacent to a desired optical information recording medium layer.

DESCRIPTION OF SYMBOLS

Figure 1:
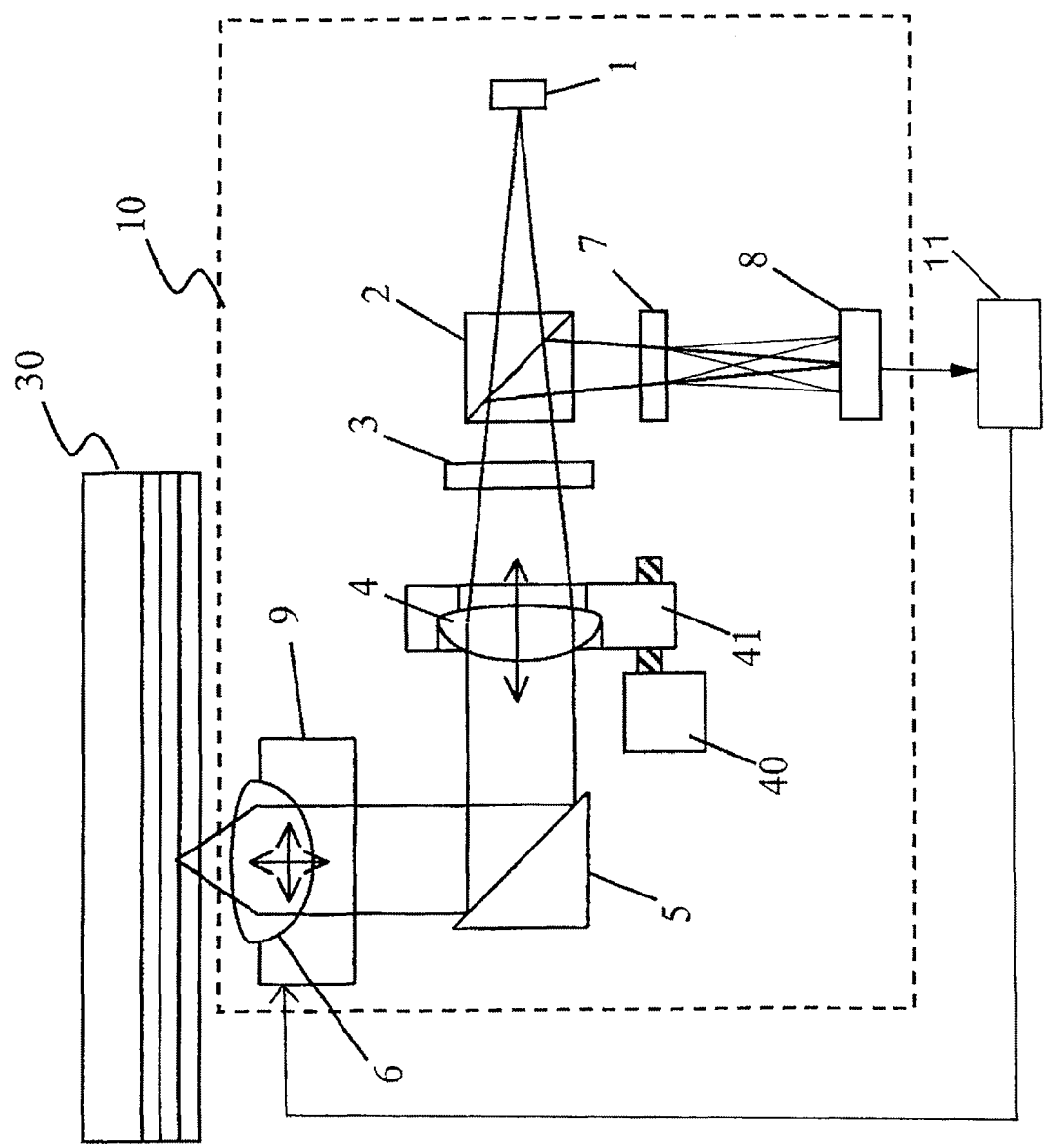
FIG. 1 is a schematic block diagram of an optical head according to a first embodiment of the present invention.

1 Semiconductor laser
2 Beam splitter
3 ¼-wave plate
4 Collimating lens
5 Reflective mirror
6 Objective lens
7 Hologram
7a, 7b, 7c Subregion
7g, 7h Dividing line
8 Photodetector
8a, 8b, 8c, 8d Light-receiving area
8x Dividing line
9 Two-axis actuator
10 Optical head
20, 21, 22 Detection spot
20m Detection spot
22n Detection spot
30 Optical disk
31, 32, 33, 34 Optical information recording medium layer
40 Stepping motor
41 Lens holder
50 Casing 51 Optical disk drive unit
52 Control unit
70 Detection light focused on target layer
70m Reflected light from adjacent layer on near side (nearer to objective lens 6) of target layer
70n Reflected light from adjacent layer on far side (farther from objective lens 6) of target layer
71 Prism
71a, 71b, 71c Sub-prism
80 Knife edge
80a Edge
111 Semiconductor laser
112 Triangular prism
121 Quarter-wave plate
122 Knife edge
123 Collimating lens
131 Polarizing beam splitter
132 Half prism
142 Objective lens
142, 143 Condensing lens
152 Two-split photodetector
153 Four-split photodetector
161, 162, 164 Electronic circuit
163 Lens actuator
171 Focus error signal
172 Tracking error signal
173 Data signal
181 Laser spot
182 Laser spot
1501 Multilayer optical disk
1511 Optical information recording medium layer
1512 Optical information recording medium layer
1513 Optical information recording medium layer
1531 to 1534 Photodetection element

BEST MODE FOR CARRYING OUT THE INVENTION

Embodiments of an optical head and optical information processing apparatus according to the present invention will be described below with reference to the appended drawings, in which identical reference numerals denote the same components or similar operations.

First Embodiment

FIG. 1 is a schematic block diagram of an optical head according to a first embodiment of the present invention.

In FIG. 1, reference numeral 1 denotes a semiconductor laser, 2 denotes a beam splitter, 3 denotes a ¼-wave plate, 4 denotes a collimating lens, 5 denotes a reflective mirror, 6 denotes an objective lens, 7 denotes a hologram, 8 denotes a photodetector, 9 denotes a two-axis actuator which drives the objective lens 6, 40 denotes a stepping motor which drives the collimating lens 4, and 41 denotes a lens holder which holds the collimating lens 4, all of which are components of the optical head 10. Incidentally, reference numeral 30 denotes an optical disk which uses a transparent substrate as a base.

Figure 2:
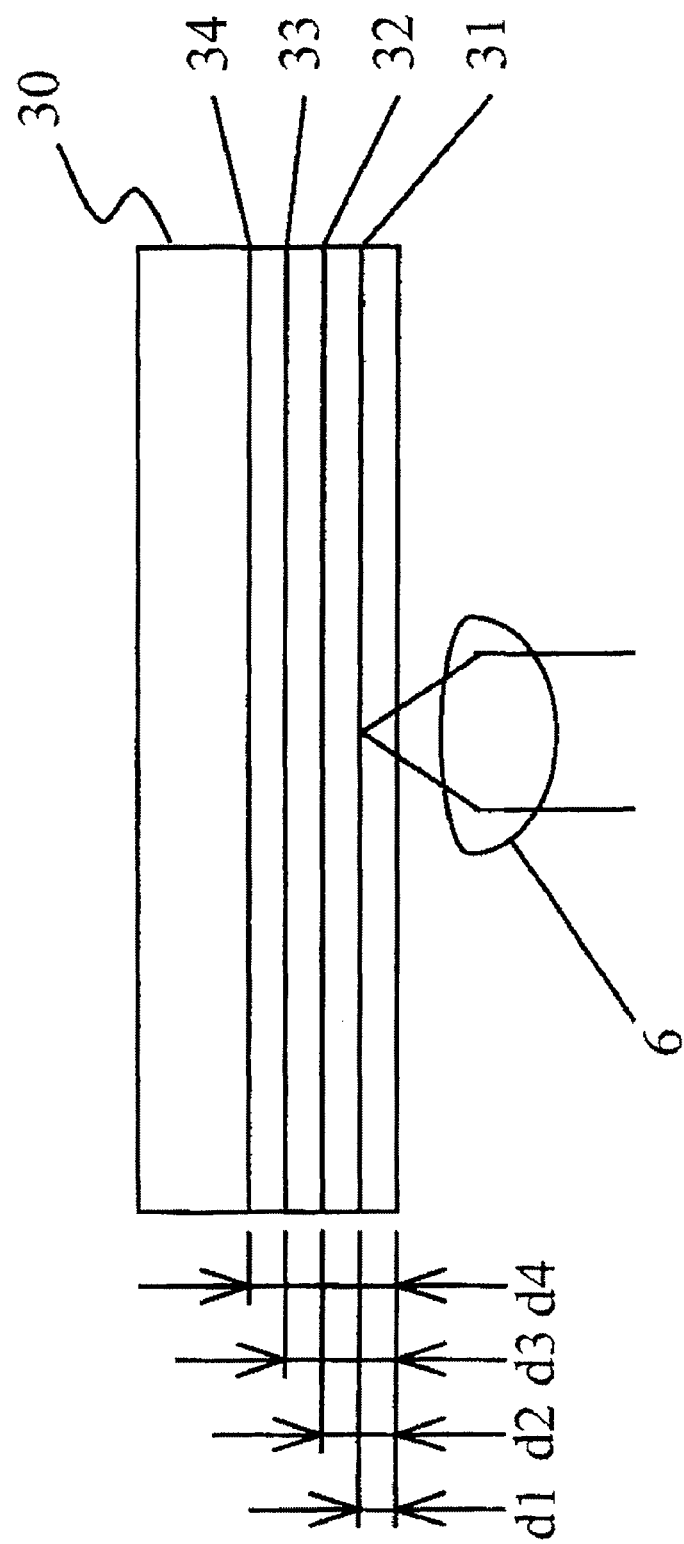
FIG. 2 is a schematic block diagram of an optical disk according to the first embodiment of the present invention.

Also, as shown in FIG. 2, optical information recording medium layers 31, 32, 33, and 34 are formed, in order from a light incidence plane (from the side of the objective lens 6), on the optical disk 30. Thicknesses of light-transmitting layers from the surface to the optical information recording medium layers 31, 32, 33, and 34 are d1, d2, d3, and d4, respectively.

Description will be given of basic operation of the optical head 10 when information is recorded or played back on/from the optical disk 30. Linearly polarized laser light emitted from the semiconductor laser 1 is transmitted through the beam splitter 2, converted into circularly polarized light by the ¼-wave plate 3, converted into a parallel beam by the collimating lens 4, reflected by the reflective mirror 5, and focused as a light spot through the transparent substrate by the objective lens 6 on an optical information recording medium layer targeted for recording or playback among the optical information recording medium layers 31 to 34 of the optical disk 30.

The laser light reflected from the specific optical information recording medium layer targeted for recording or playback (hereinafter referred to as the target layer) is transmitted through the objective lens 6 again, reflected by the reflective mirror 5, transmitted through the collimating lens 4, converted by the ¼-wave plate 3 into linearly polarized light different from the polarized light in the outward travel, reflected by the beam splitter 2, and led to the photodetector 8 by the hologram 7.

The laser light detected by the photodetector 8 is subjected to photoelectric conversion, and then subjected to computations by a computing unit 11 to generate a focus error signal needed to follow surface movement of the optical disk 30 and tracking error signal needed to follow eccentricity. Based on the focus error signal and tracking error signal, the two-axis actuator 9 drives the objective lens 6 in two axis directions so that the light spot will follow information tracks of the rotating optical disk 30.

The collimating lens 4 is held in the holder 41 in such a way as to be able to move along an optical axis of the laser light by being driven by the stepping motor 40. According to the thicknesses of the light-transmitting layers of the optical information recording medium layers 31 to 34, the laser light is converted into diverging light or converging light by the collimating lens 4 so as to correct spherical aberration due to the thicknesses of the light-transmitting layers. Then, the spherical aberration is corrected using spherical aberration of reverse polarity generated by the objective lens 6.

The present invention is distinguished by the hologram 7 and photodetector 8 which constitutes a detection optical system of the optical head. This will be described in detail below.

Figure 3:
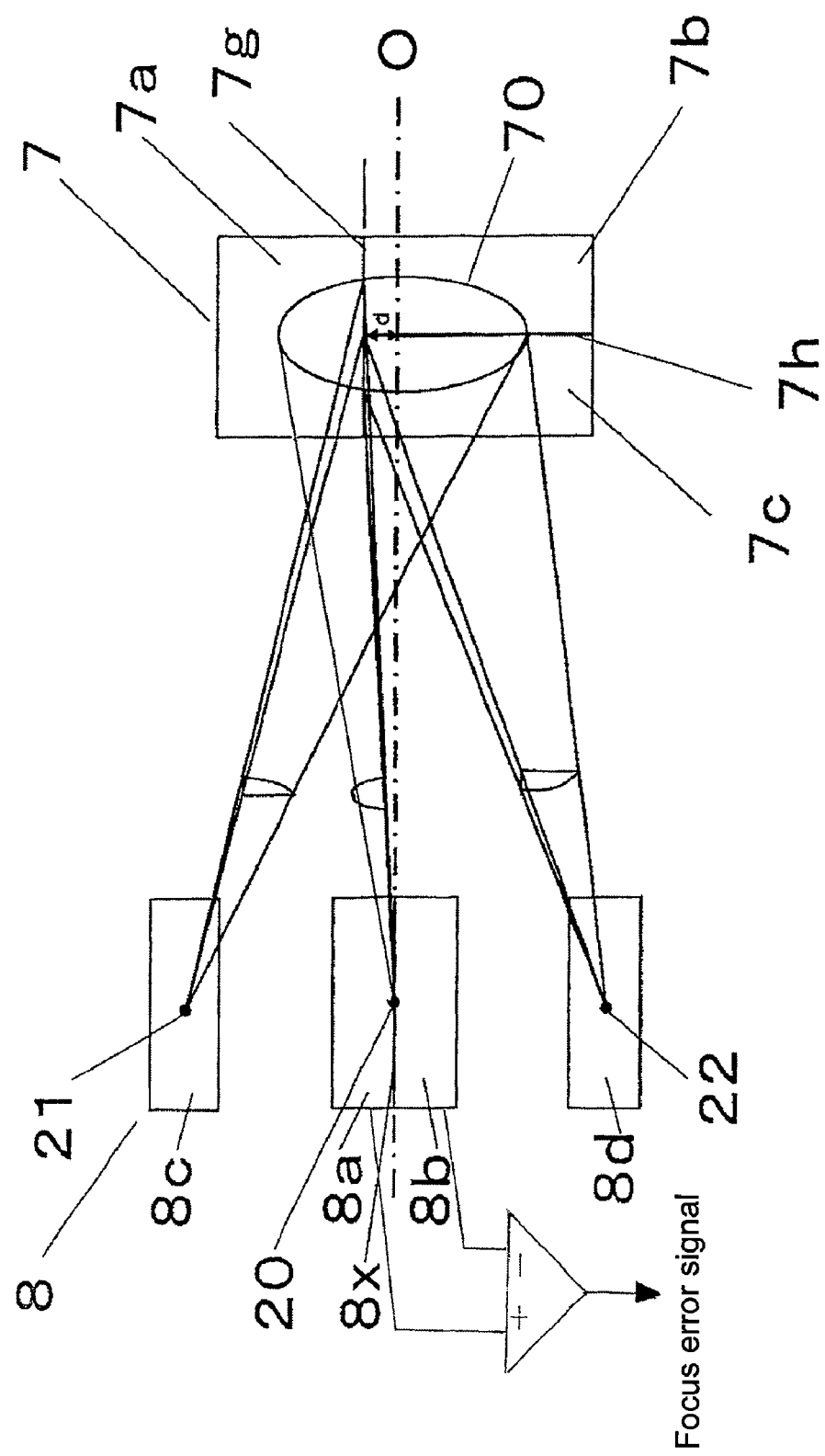
FIG. 3 is a schematic diagram of a detection system according to the first embodiment of the present invention.
Figure 4A:
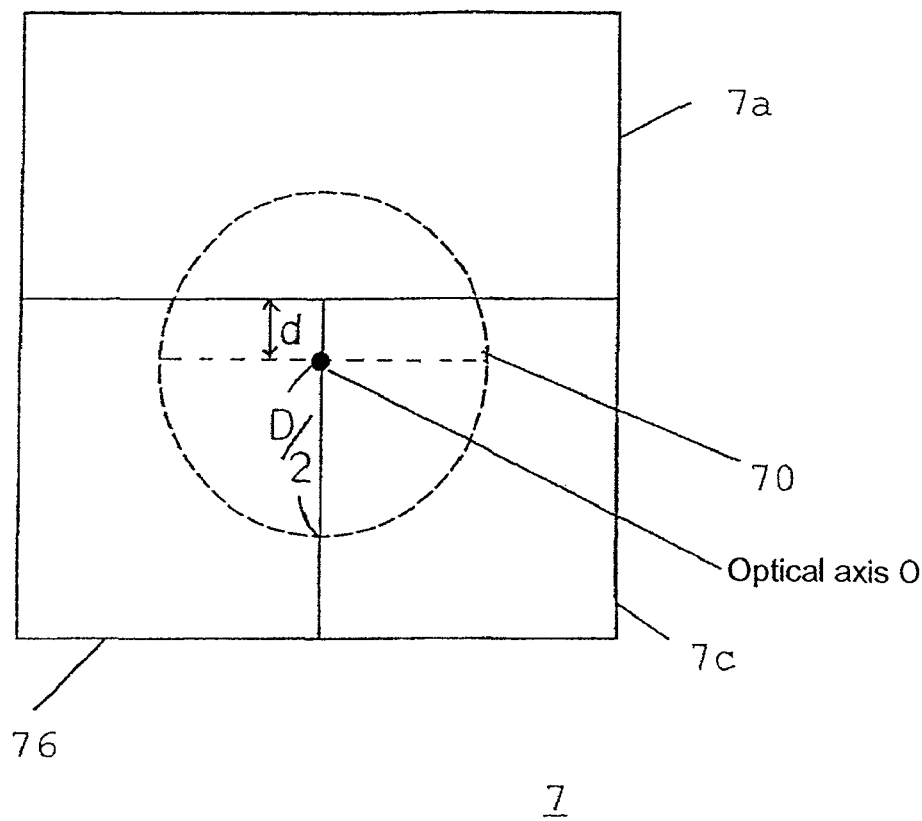
FIG. 4(a) is a front view showing a configuration of a hologram 7.
Figure 4B:
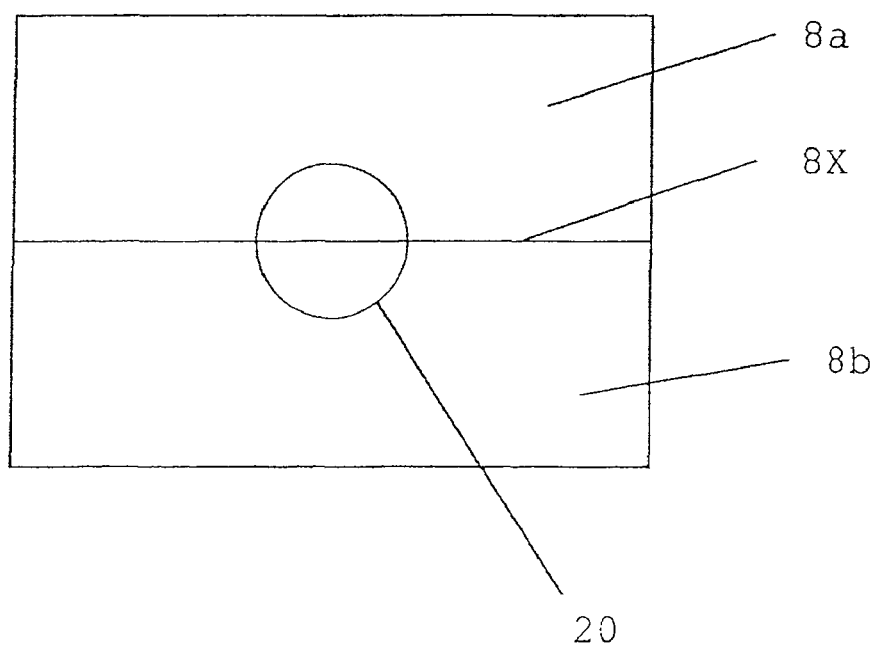
FIG. 4(b) is a front view showing a configuration of light-receiving areas 8a and 8b.

FIG. 3 is a schematic diagram of the detection optical system in the optical head according to the present embodiment. FIG. 4(a) is a front view showing a configuration of the hologram 7 and FIG. 4(b) is a front view showing a configuration of light-receiving areas 8a and 8b. In FIG. 3, the hologram 7 is shown in a perspective view to illustrate an optical path in the detection optical system and the photodetector 8 is shown in a plan view to illustrate a configuration of the photodetector 8.

As shown in FIG. 3 and FIG. 4(a), the hologram 7 includes a dividing line 7g and dividing line 7h, where the dividing line 7g is a straight line parallel to, and a distance d (d>0) away from, a diameter of a detection spot formed by a luminous flux of reflected light from the target layer in a passage plane of reflected light from the optical disk 30 while the dividing line 7h extends from the center of the dividing line 7g perpendicularly to the dividing line 7g.

Consequently, the hologram 7 is divided into three subregions 7a, 7b, and 7c. Then, grids of different patterns are formed corresponding to the subregions 7a, 7b, and 7c to provide a predetermined diffraction direction (described later). Areas of the subregions 7a, 7b, and 7c satisfy the relationship 7a<(7b+7c).

As shown in FIG. 3, the photodetector 8 has four light-receiving areas 8a, 8b, 8c, 8d rectangular in shape. The central light-receiving areas 8a and 8b, which are intended for detection of focus errors, are divided by a dividing line 8x, and the focus error signal is obtained based on a difference between signal outputs from the light-receiving areas 8a and 8b.

The dividing line 8x is orthogonal to an optical axis O of the reflected light from the target layer of the optical disk 30. In FIG. 3, the dividing line 8x and optical axis O are shown as being almost parallel to each other near an intersection for the sake of drawing clarity.

On the other hand, the light-receiving areas 8c and 8d which sandwich the light-receiving areas 8a and 8b are intended for detection of tracking errors.

In the above description, the semiconductor laser 1 corresponds to the light source according to the present invention; the beam splitter 2, ¼-wave plate 3, collimating lens 4, reflective mirror 5, objective lens 6, two-axis actuator 9, stepping motor 40, and holder 41 correspond to the condensing unit according to the present invention; the photodetector 8 corresponds to the photodetection unit according to the present invention; and the hologram 7 corresponds to the luminous flux extracting unit according to the present invention.

Next, state of detection light on the photodetector 8 will be described with reference to FIG. 3 and FIG. 4 (*b*). When the laser light constitutes detection light 70 focused on the target layer of the optical disk 30, the detection light diffracted in the subregion 7a of the hologram 7 forms a detection spot 20 on the dividing line 8x. This is because an adjustment has been made during assembly such that after diffraction in the subregion 7a, a detection spot will be formed on the dividing line 8x. In such an in-focus state, the detection spot 20 is divided into two parts on the dividing line 8x as shown in FIG. 4(*b*) and the light-receiving areas 8a and 8b produce output signals of equal magnitude. Consequently, the difference between the output signals from the light-receiving areas 8a and 8b, i.e., the focus error signal, becomes zero.

On the other hand, the detection light diffracted in the subregions 7b and 7c form detection spots 21 and 22 in the light-receiving areas 8c and 8d, respectively.

Figure 5:
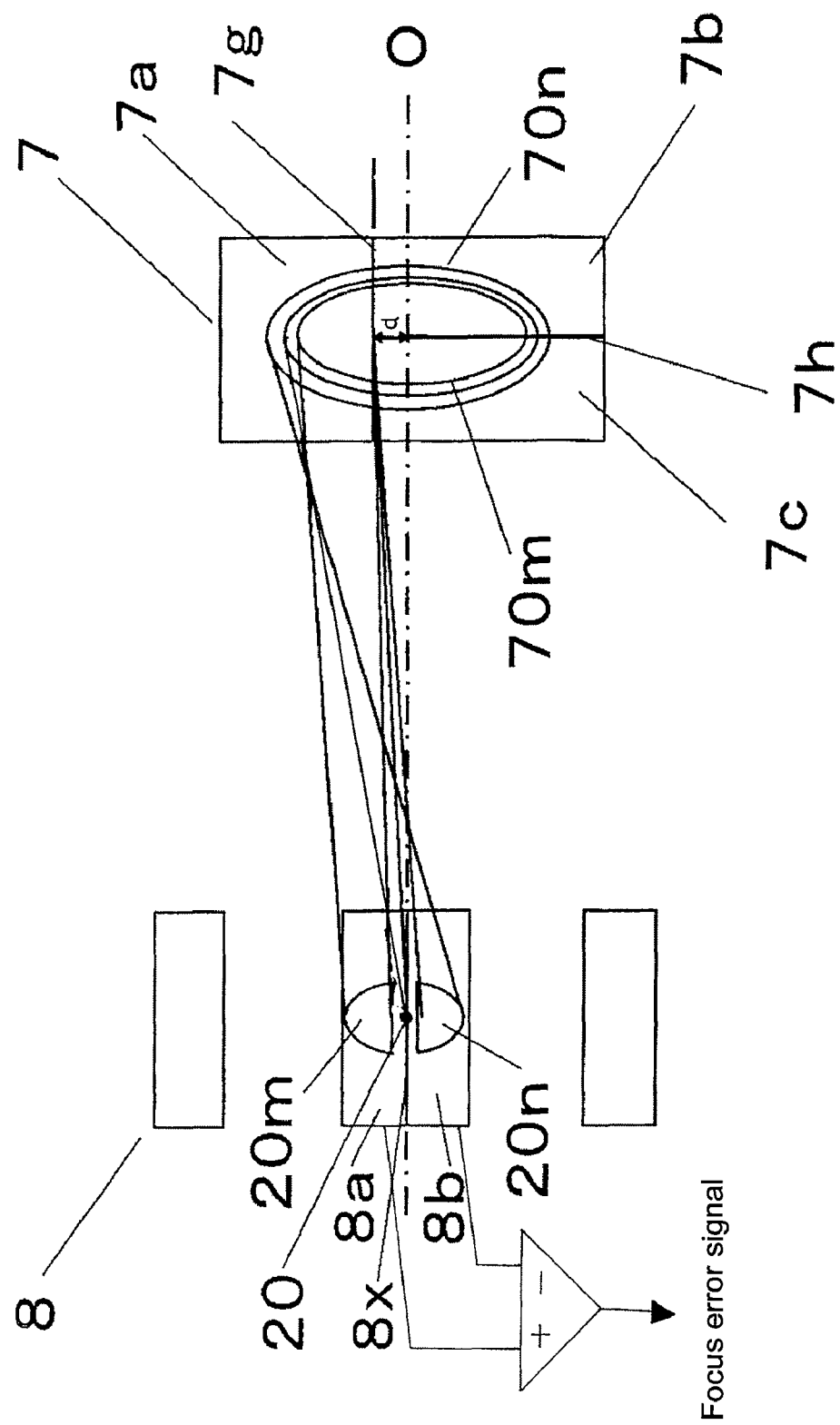
FIG. 5 is a schematic diagram showing how a detection spot is received from adjacent layers, according to the first embodiment of the present invention.

Next, FIG. 5 shows state of the detection optical system when reflected light enters the target layer from other optical information recording medium layers (hereinafter referred to as adjacent layers) adjacent to the target layer.

Reflected light 70m from the adjacent layer on the near side (nearer to the objective lens 6) of the target layer is diffracted by the subregion 7a of the hologram 7 and forms a detection spot 20m on the light-receiving area 8a. Also, reflected light 70n from the adjacent layer on the far side (farther from the objective lens 6) of the target layer forms a detection spot 20n on the light-receiving area 8b.

Luminous fluxes of the reflected light 70m and 70n from adjacent layers which form the detection spots 20m and 20n do not include the optical axis O because of the dividing line 7g of the hologram 7.

As described with reference to FIG. 3, position of the subregion 7a relative to the light-receiving areas 8a and 8b is designed such that the reflected light from the target layer will be brought into focus when a light spot formed by the diffracted light from the subregion 7a is placed on the dividing line 8x of the light-receiving areas 8a and 8b.

When the reflected light goes out of focus the following effect is occurred as well as the light spot increases in size and shape: A luminous flux from which the light spot originates does not include the optical axis O of the luminous flux of the reflected light from the target layer, and thus formation position on the light-receiving areas 8a and 8b moves away from the dividing line 8x.

Reflected light from the adjacent layers is equivalent to the reflected light from the target layer when the target layer is out of focus. Thus, luminous fluxes of the reflected light from the adjacent layers form defocused light spots on the light-receiving areas 8a and 8b in directions away from the dividing line 8x.

In the example shown in FIG. 5, the detection spot 20m formed by the reflected light from the adjacent layer on the near side of the target layer is located close to the light-receiving area 8a while the detection spot 20n formed by the reflected light from the adjacent layer on the opposite side of the target layer is located close to the light-receiving area 8b.

That is, the detection spot 20 formed by the reflected light from the target layer and the detection spots 20m and 20n formed by the reflected light from the adjacent layers are placed on the light-receiving areas 8a and 8b without overlap.

Since there is no interference of reflected light, even if there is surface movement of the optical disk 30, variations in the signal outputs of the light-receiving areas are so small that changes in the focus error signal represented by the difference can be kept within predetermined tolerances. That is, a stable focus servo can be implemented without disturbing the focus error signal.

Also, since tracking control is performed by obtaining a tracking error signal using the luminous flux which includes the optical axis of the reflected light from the target layer, it is possible to implement stable tracking control by providing sufficient light quantities.

In the above description, the subregion 7a of the hologram 7 corresponds to the first transparent surface according to the present invention while the subregions 7b and 7c correspond to the second transparent surface according to the present invention. Also, the light-receiving area 8a of the photodetector 8 corresponds to the first photodetection area according to the present invention while the light-receiving area 8b corresponds to the second photodetection area according to the present invention. Also, the diffracted light which forms the detection spots 20, 20m, and 20n corresponds to the first luminous flux branch according to the present invention while the diffracted light which reaches the light-receiving areas 8c and 8d correspond to the second luminous flux branch according to the present invention.

A ratio of signal power between the detection spot 20 and the detection spots 20m and 20n is on the order of 100:1. Thus, it is considered that the output power of the detection spots 20m and 20n itself does not cause significant disturbances in the focus error signal.

Figure 6:
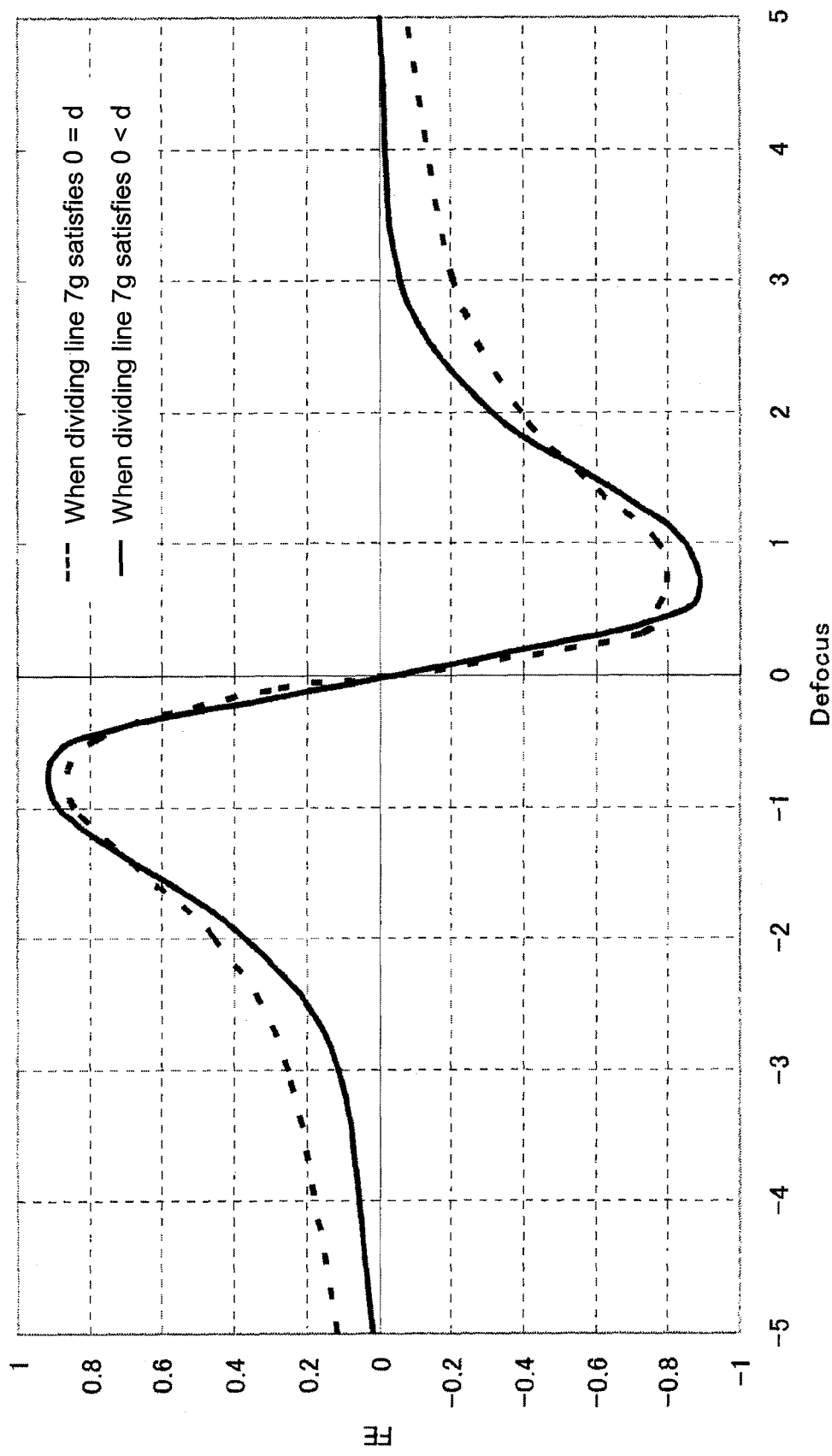
FIG. 6 is a diagram showing focus error signals according to the first embodiment of the present invention.

FIG. 6 is a diagram of focus error signals showing another advantage of the present embodiment. In the figure, the solid line represents focus error signal power of the light-receiving areas 8a and 8b when the areas of the three subregions 7a, 7b, and 7c of the hologram 7 satisfy the relationship $7a<(7b+7c)$, i.e., when the dividing line 7g of the hologram 7 is shifted a distance d from position of the optical axis O formed on the hologram 7 by the reflected light from the target layer of the optical information recording medium.

On the other hand, the broken line in the figure represents a focus error signal from the light-receiving areas 8a and 8b when the areas of the three subregions 7a, 7b, and 7c of the hologram 7 satisfy the relationship $7a=(7b+7c)$, i.e., when the dividing line 7g coincides with the diameter of the detection spot (distance d=0). At this time, location of the dividing line 7h is irrelevant.

By comparing power between the focus error signals, it can be seen that the focus error signal converges more quickly during defocusing when the dividing line 7g of the hologram 7 is shifted by the distance d (0<d) from the diameter of the detection spot formed on the hologram 7. This makes it possible to separate focus error signals among narrow layers.

As long as the position of the dividing line 7g of the hologram 7, i.e., the distance d from the position of the optical axis O, is equal to or larger than zero, the optical axis of the original luminous flux is not included, and the above-described advantage of the present invention, i.e., the advantage of eliminating disturbances in the focus error signal, is available, but preferably the distance d satisfies Formula 1 below.

$$d \leq (0.5 \times (D/2)) \quad \text{(Formula 1)}$$

Generally, to control the focus servo in a stable manner even if there are defects caused by dust, fingerprints, flaws, and the like on the optical disk, desirably, light quantity which constitutes 20% or more of total quantity of reflected light of the optical disk is secured for the focus error signal.

Figure 7:
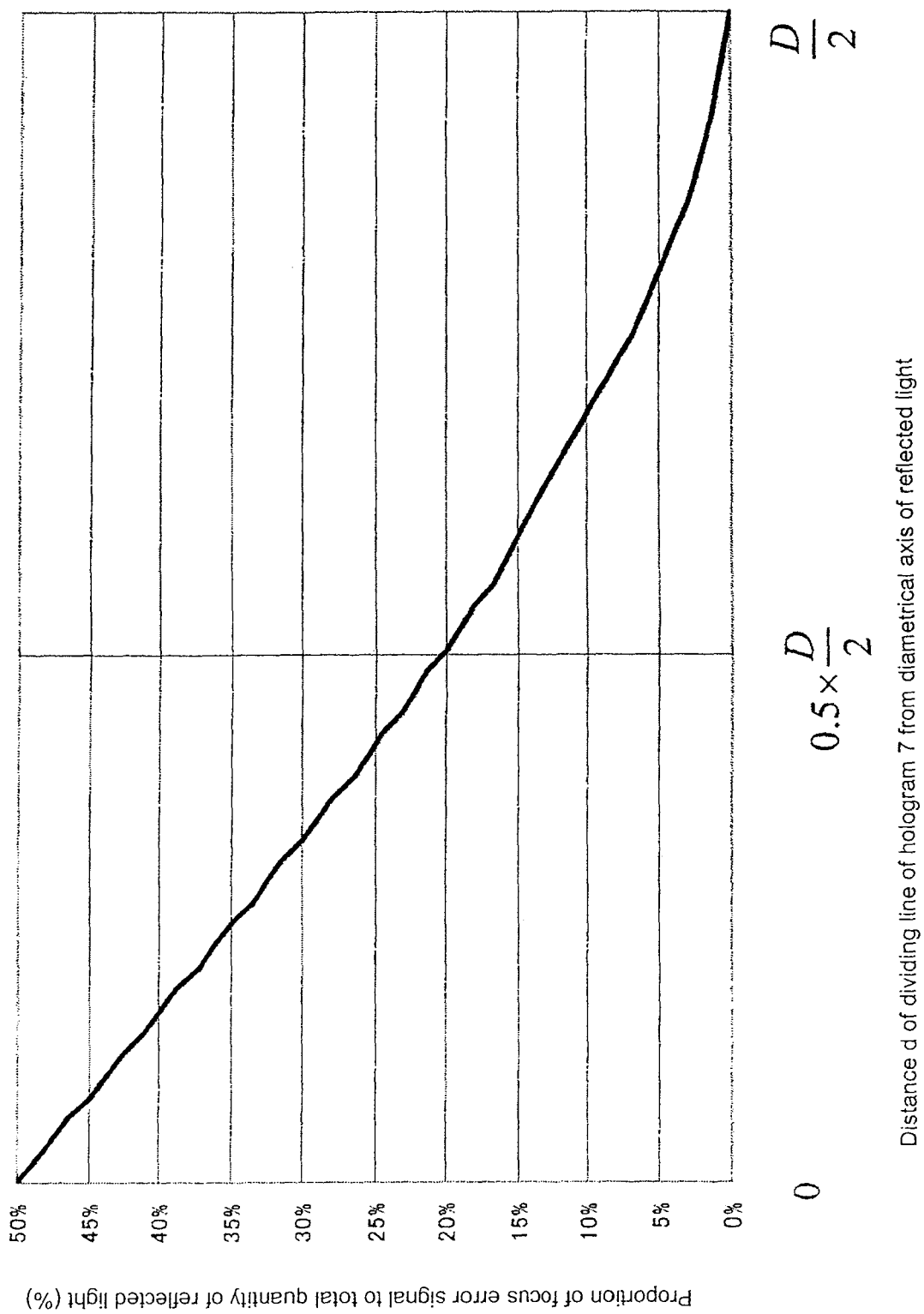
FIG. 7 is a diagram showing a relationship between a distance d of position of a dividing line 7g in the hologram 7 and a ratio of the focus error signal to quantity of reflected light from an optical disk 30, according to the first embodiment of the present invention.

FIG. 7 is a diagram showing a relationship between the distance d of the position of the dividing line 7g in the hologram 7 and a ratio of the focus error signal to the quantity of the reflected light from the optical disk 30. It can be seen that a desired light quantity can be secured for the focus error signal if the distance d is set equal to or smaller than ½ the radius of the detection spot, or equal to or smaller than (0.5× (D/2) in terms of the diameter D.

As described above, the optical head according to the present embodiment can reduce disturbances in a focus error signal due to the reflected light from optical information recording medium layers adjacent to the optical information recording medium layer targeted for recording or playback in an optical disk in which a plurality of optical information recording medium layers are stacked together. This improves reliability of information recording and playback on/from the optical disk.

Also, convergence of the focus error signal can be speeded up.

Second Embodiment

Figure 8:
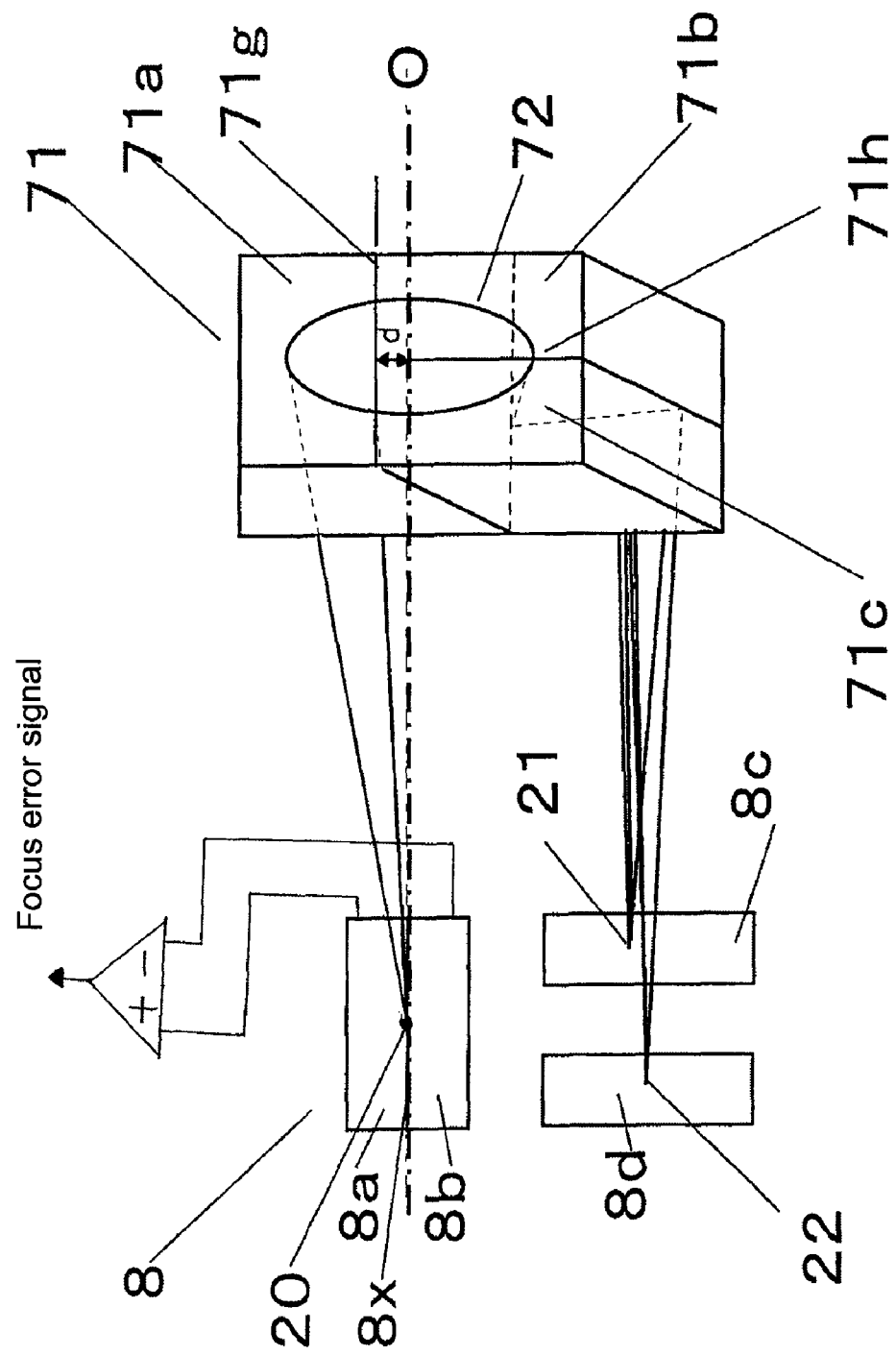
FIG. 8 is a schematic diagram of a detection system according to a second embodiment of the present invention.

FIG. 8 is a schematic diagram of a detection optical system according to a second embodiment of the present invention. The second embodiment has the same configuration as the first embodiment except for the detection optical system, and detailed description of common part will be omitted. Also, in FIG. 8, the same or equivalent components are denoted by the same reference numerals as the corresponding components in FIG. 3, and detailed description thereof will be omitted.

A prism 71, which is an instrument installed at a position of the optical path of the hologram 7 according to the first embodiment, is divided into three parts by dividing planes 71g and 71h, where the dividing plane 71g is parallel to a diameter of a detection spot formed by a luminous flux of reflected light from the target layer in an incident surface of reflected light from the optical disk 30 and to a straight line located a distance d (d>0) away from the position of the optical axis O while the dividing plane 71h extends from the center of the dividing plane 71g perpendicularly to the dividing plane 71g.

Consequently, the prism 71 is divided into three sub-prisms 71a, 71b, and 71c, which are designed to direct the incident light at the light-receiving areas 8a and 8b, light-receiving area 8c, and light-receiving area 8d, respectively.

On the sub-prisms 71a, 71b, and 71c of the prism 71, areas of incident surfaces for the reflected light from the optical disk 30 satisfy the relationship 71a<(71b+71c).

With this configuration, upon entering the incident surfaces of the prism 71, a luminous flux of the reflected light from the optical disk 30 is branched into different luminous fluxes by the sub-prisms 71a, 71b, and 71c.

At this time, the luminous flux which reaches the light-receiving areas 8a and 8b after passing through the sub-prism 71a forms the detection spot 20 on the dividing line 8x when focused if the luminous flux comes due to the reflected light from the target layer. This is because an adjustment has been made during assembly such that after refraction by the sub-prism 71a, a detection spot will be formed on the dividing line 8x. Also, as in the case of the first embodiment, the dividing line 8x is orthogonal to the optical axis O of the reflected light from the target layer of the optical disk 30. Again in FIG. 8, the dividing line 8x and optical axis O are shown as being almost parallel to each other near the intersection for the sake of drawing clarity. Also, the light which forms the detection spot 20 after passage through the sub-prism 71a corresponds to the first luminous flux branch according to the present invention.

In such an in-focus state, the difference between the output signals from the light-receiving areas 8a and 8b, i.e., the focus error signal, becomes zero.

On the other hand, when the reflected light from the target layer is focused, the light which enters the sub-prism 71a at the same time by being reflected by the adjacent layers is equivalent to reflected light from the target layer when the target layer is out of focus, and thus forms defocused light spots on the light-receiving areas 8a and 8b in directions away from the dividing line 8x.

As described above, a part of the reflected light from the optical disk 30 which does not include the optical axis is extracted by refracting using the prism 71 as a luminous flux extracting unit, thus the present embodiment provides the same advantage as the optical head according to the first embodiment.

Furthermore, the luminous flux extracting unit according to the present invention is not limited by specific configurations or functions as long as the first luminous flux branch which does not include the optical axis of the luminous flux of the reflected light from the target layer can be extracted.

Thus, in addition to the diffraction-based hologram according to the first embodiment and the refraction-based prism according to the second embodiment, a shielding-based knife edge may be used as well. The knife edge differs from a conventional counterpart in that the knife edge is used as means for extracting that part of the luminous flux of incident light which does not include the optical axis of the luminous flux and inputs the extracted part as the first luminous flux branch according to the present invention in the light-receiving areas 8a and 8b of the photodetector 8.

Figure 9:
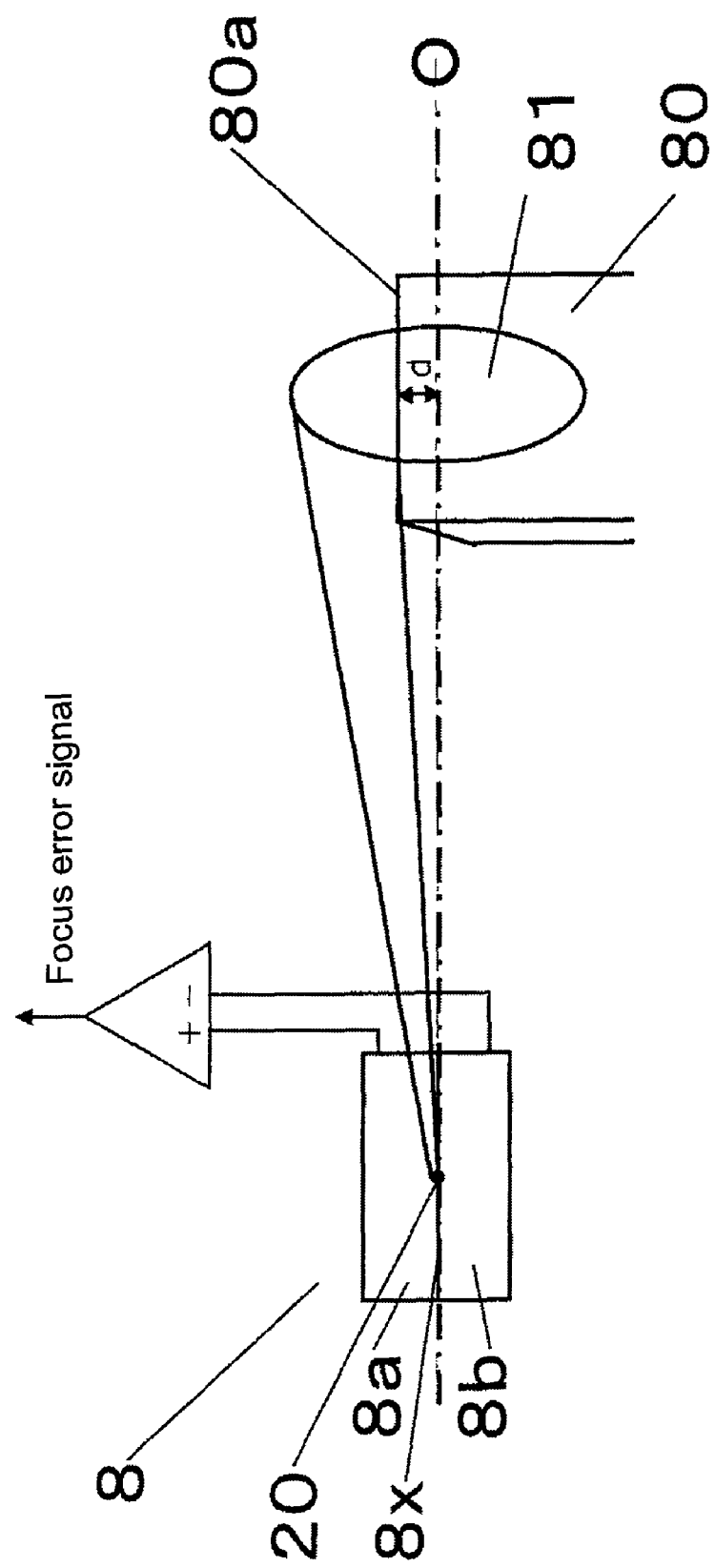
FIG. 9 is a schematic diagram showing another configuration example of the detection system according to the second embodiment of the present invention.

FIG. 9 is a diagram showing a configuration example in which a knife edge is used. In FIG. 9, when laser light is focused on the target layer of the optical disk 30, part of the laser light is shielded by a knife edge 80 and the remaining unshielded part of the laser light forms a detection spot 20 on the dividing line 8x. This is because an adjustment has been made during assembly such that a detection spot formed by light that has not been shielded by an edge 80a of the knife edge 80 will be formed on the dividing line 8x. The dividing line 8x is orthogonal to the optical axis O of the reflected light from the target layer of the optical disk 30. In FIG. 9, the dividing line 8x and optical axis O are shown as being almost parallel to each other near the intersection for the sake of drawing clarity.

The light which forms the detection spot 20 without being shielded by the edge 80a of the knife edge 80 corresponds to the first luminous flux branch according to the present invention. In such an in-focus state, the difference between the output signals from the light-receiving areas 8a and 8b, i.e., the focus error signal, becomes zero.

On the other hand, when the reflected light from the adjacent layers enters, the light which passes through the knife edge 80 at the same time by being reflected by the adjacent layers is equivalent to reflected light from the target layer when the target layer is out of focus, and thus forms defocused light spots on the light-receiving areas 8a and 8b in directions away from the dividing line 8x, as in the case of the first embodiment and the configuration example in FIG. 8.

Incidentally, when the knife edge 80 is used as a luminous flux extracting unit, that part of the reflected light which is shielded by the knife edge 80 and forms a light spot 81 on an end face of the knife edge 80 cannot be used in other applications and thus, the tracking error signal has to be detected separately.

In the above embodiments, the hologram 7, prism 71, and other optical elements are not limited in terms of material. Glass, resin, plastics, or any other material may be used as long as predetermined optical functions are available. Also, although the luminous flux extracting unit has been described as being a single optical element (hologram or prism) provided in each embodiment, a combination of such optical elements may be used as the luminous flux extracting unit.

Also, although the light-receiving areas 8a and 8b has been described as being equal in area in the above embodiments, the light-receiving areas 8a and 8b may have different areas. This will make it possible to reduce size of the photodetector 8, increasing layout design flexibility of the photodetector 8 in the optical head as well as prevent invasion of stray light and the like as noise. In short, the light-receiving areas 8a and 8b are not limited by shapes of other parts as long as a dividing line 8x between the light-receiving areas 8a and 8b are located in such a way as to intersect the optical axis coming from the target layer.

Also, although the optical disk 30 has four optical information recording medium layers 31, 32, 33, and 34 in the above embodiments, the present invention is applicable to an optical disk which has three or more optical information recording medium layers.

In particular, with an optical disk which has four or more optical information recording medium layers, in addition to the laser light reflected from the target layer and adjacent layers, laser light reflected from optical information recording medium layers farther than the adjacent layers may be lead to the photodetector 8, but such laser light also forms separate light spots on the light-receiving areas 8a and 8b as in the case of the laser light from the adjacent layers, and thus does not affect reception of the reflected light from the target layer. In this way, since the reflected light from the target layer and the reflected light from the other optical information recording medium layers can be obtained as separate light spots, the present invention is not limited by the number of optical information recording medium layers.

The present invention is not limited by wavelength of a light beam and may be used for DVD (with a wavelength of 660 nm), CD (with a wavelength of 785 nm), BD (with a wavelength of 405 nm), and other disks. In particular, in view of increases in the number of layers and in packaging density, it is desirable to apply the present invention to the BD and an optical head which uses short-wavelength laser light with a wavelength of 408 nm. The present invention is effective when interlayer distance of optical information recording medium layers (which corresponds to the thicknesses d1 to d4 of the light-transmitting layers in FIG. 2) is 40 µm or less, and preferably 25 µm or less. This is because the present invention can reduce effect of other adjacent layers whereas a larger interlayer distance reduces effect of the reflected light from the adjacent layers while making it difficult to implement multiple layers within the limited thickness of the disk. In this way, the present invention offers the advantage of enabling recording and playback on/from a multilayer optical disk with a smaller interlayer distance and larger number of layers.

Third Embodiment

Figure 10:
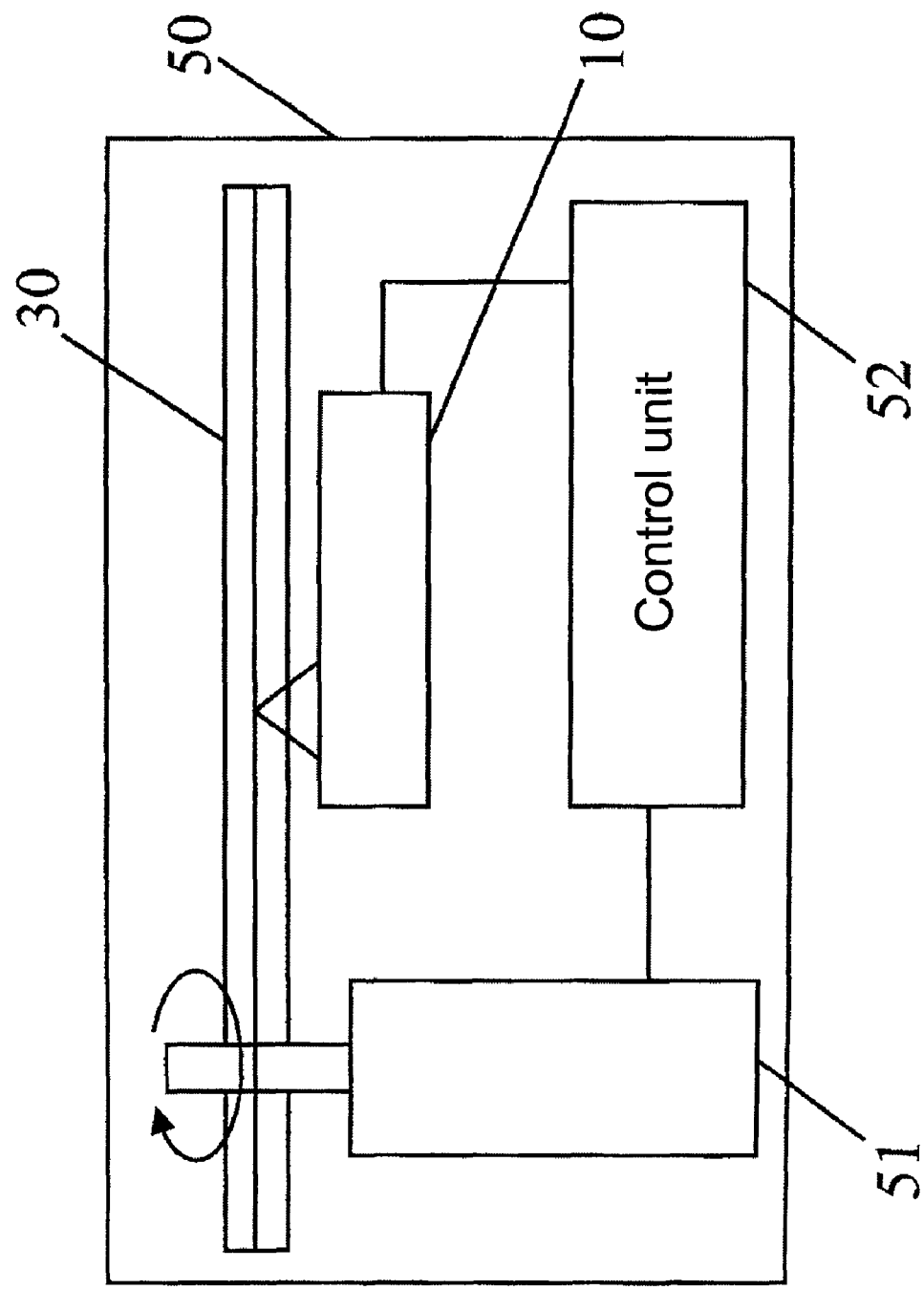
FIG. 10 is a schematic block diagram of an optical information processing apparatus according to a third embodiment of the present invention.
Figure 11:
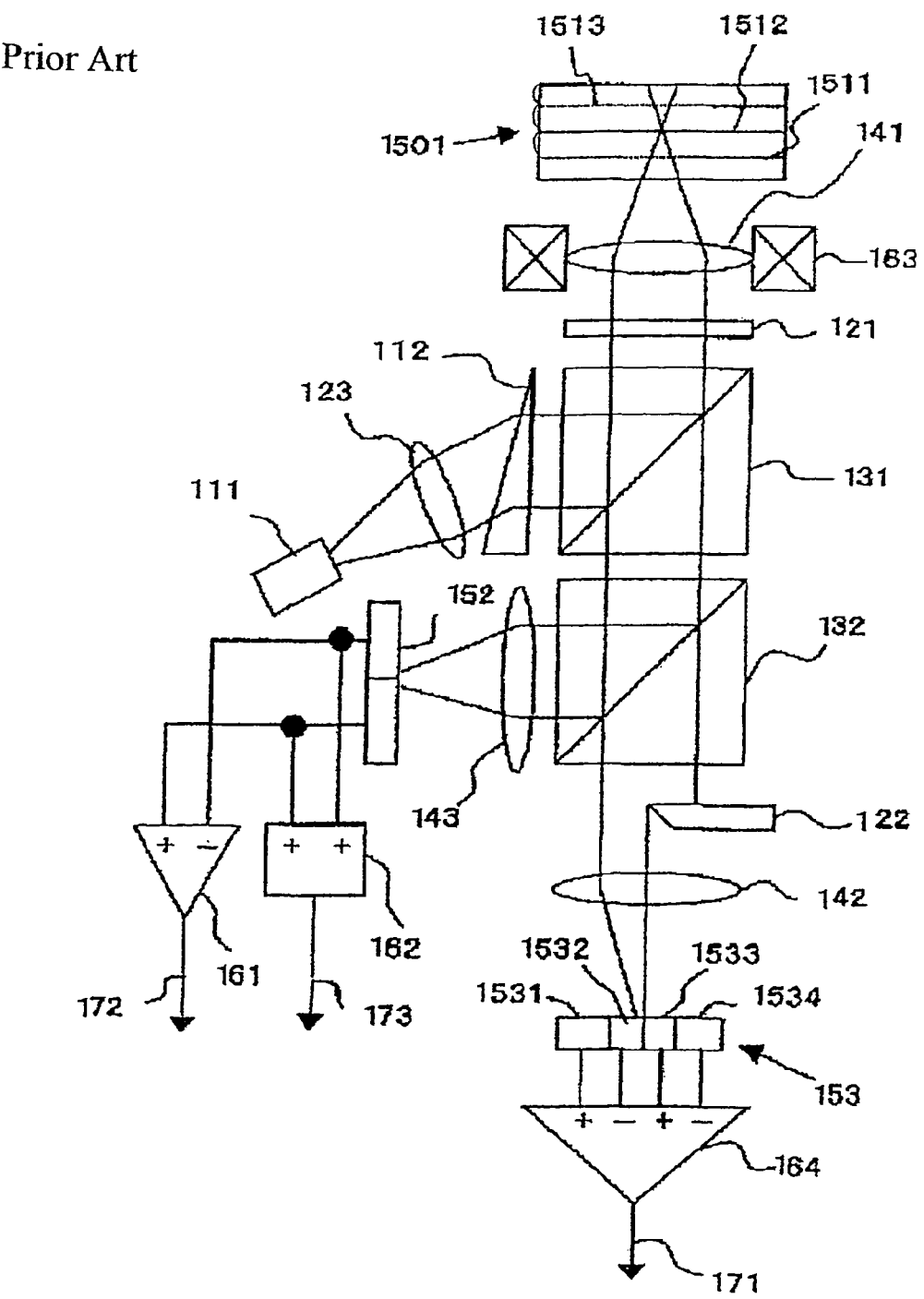
FIG. 11 is a schematic block diagram showing a configuration of a conventional optical information recording medium and optical head.
Figure 12:
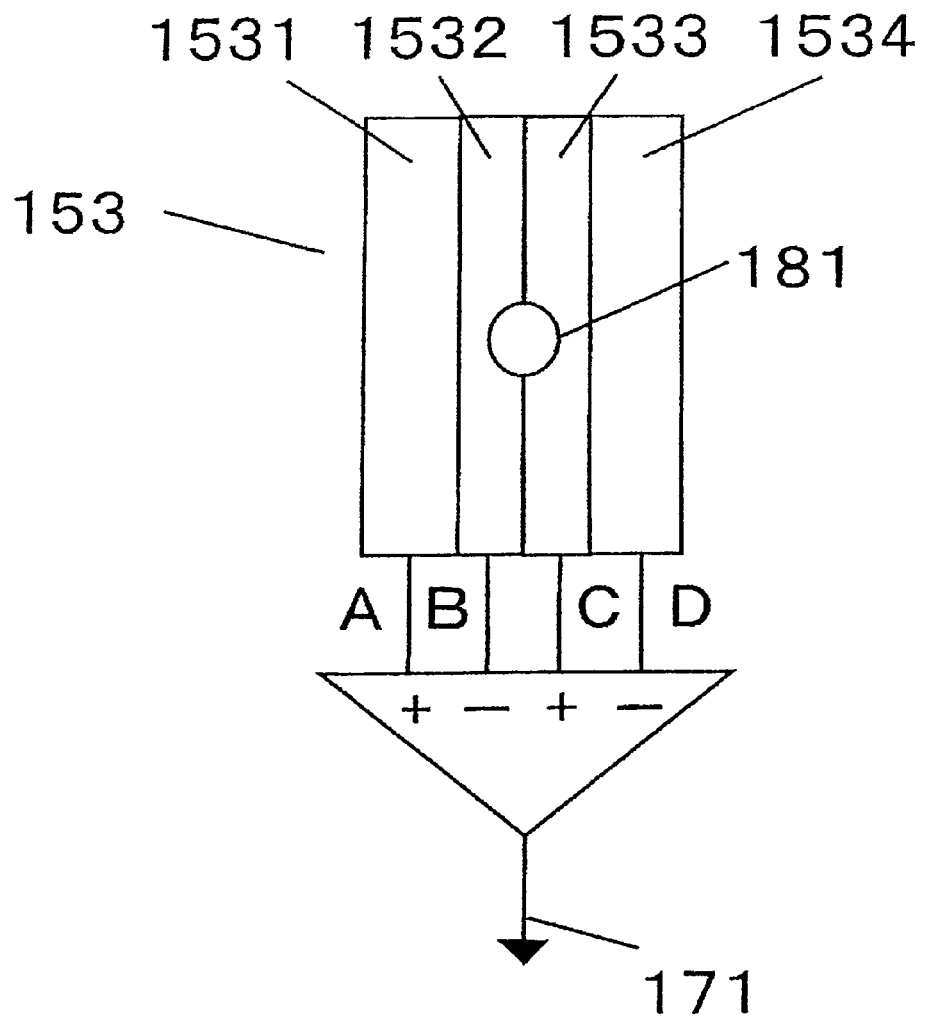
FIG. 12 is a schematic diagram showing an image formed on a four-split photodetector by reflected light from an optical information recording medium layer at an in-focus position of the conventional optical head.
Figure 13:
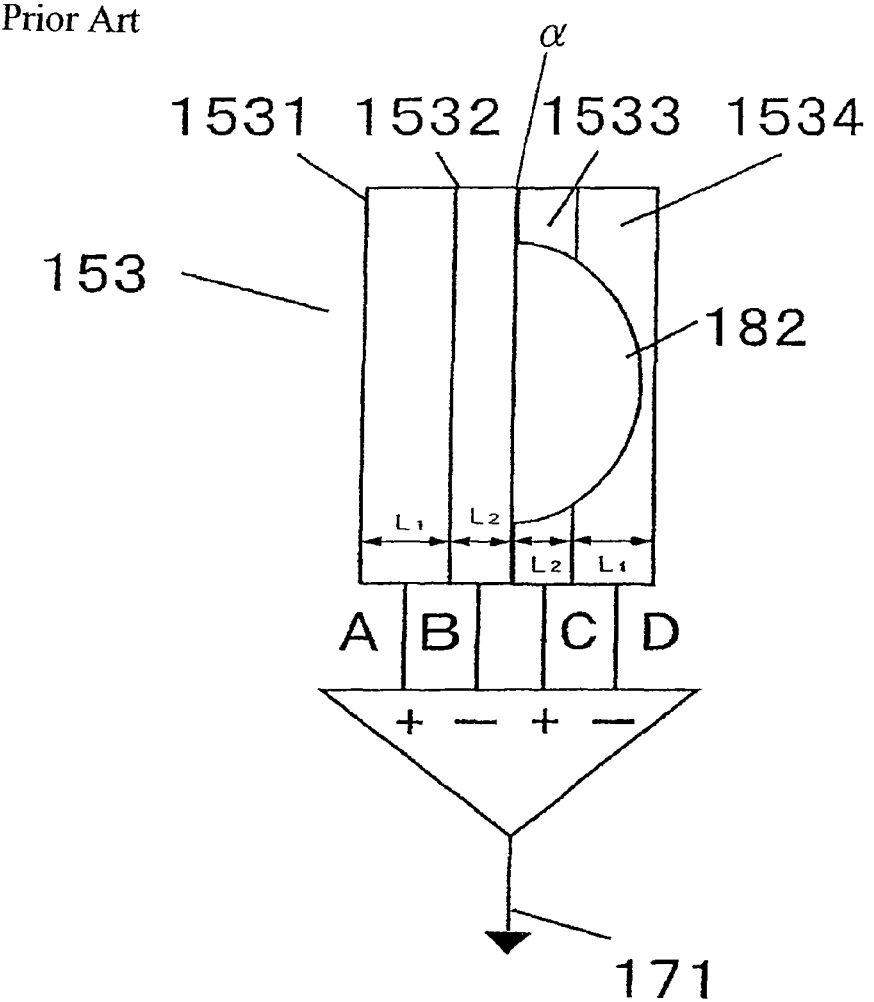
FIG. 13 is a schematic diagram showing an image formed on a four-split photodetector by reflected light from an adjacent optical information recording medium layer with the conventional optical head.
Figure 14:
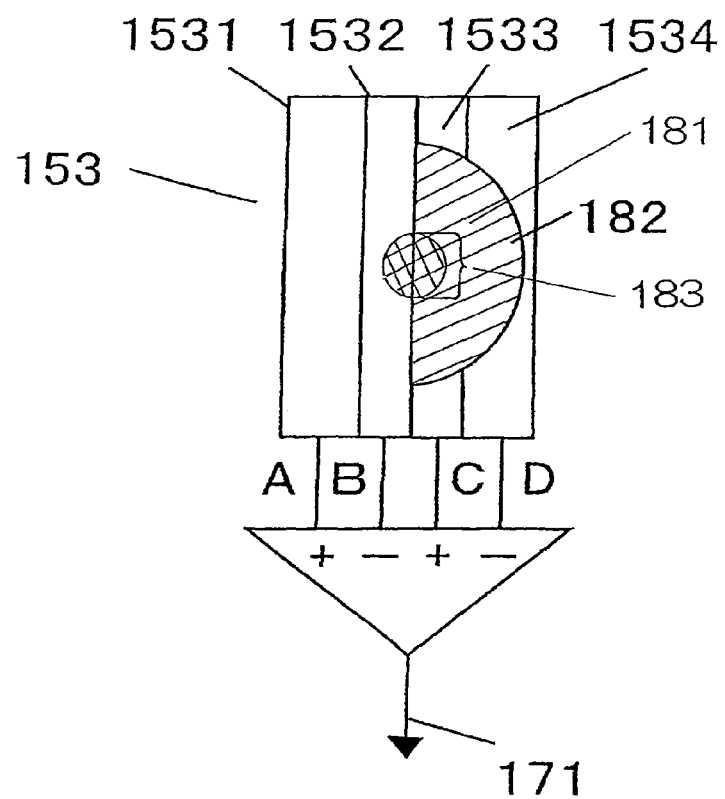
FIG. 14 is a diagram illustrating a problem with the conventional optical head.

FIG. 10 is a schematic block diagram of an optical information processing apparatus according to a third embodiment of the present invention.

In FIG. 10, reference numeral 50 denotes a casing of the entire optical information processing apparatus. The casing 50 contains an optical disk drive unit 51, control unit 52, and optical head 10. Reference numeral 30 denotes an optical disk. The optical disk drive unit 51 has a function to rotationally drive the optical disk 30. The optical head 10 is one of the optical heads described in the first or the second embodiment. The control unit 52 has a function to drive and control the optical disk drive unit 51 and optical head 10, a function to process a control signal and information signal received by the optical head 10, and a function to provide an interface between the inside and outside of the casing 50 for the information signal.

The use of the optical head according to the first or second embodiment as the optical head 10 of the optical information processing apparatus described above makes it possible to reduce disturbances in the focus error signal, and thereby achieve stable operation in reading or writing information from/to the optical disk 30.

INDUSTRIAL APPLICABILITY

The optical head and control method therefor according to the present invention have the advantage of reducing disturbances in a focus error signal due to reflected light from optical information recording medium layers adjacent to a desired optical information recording medium layer, and are useful as an optical head, optical information processing apparatus, and the like.

The invention claimed is:
1. An optical head comprising:
a light source;
a condensing unit which collects light from the light source and directs the light onto an optical disk which has a plurality of optical information recording medium layers;
a luminous flux extracting unit which extracts, from a luminous flux of reflected light from the optical disk, at least a first luminous flux branch which does not include the optical axis of the luminous flux; and
a photodetection unit which receives the reflected light from the optical disk and produces signal output,
wherein the photodetection unit has a-first and second photodetection areas which receive the first luminous flux branch of reflected light from an optical information recording medium layer targeted for recording or playback out of the plurality of optical information recording medium layers of the optical disk, and
the first and second photodetection areas are divided by a boundary line which includes an intersecting point of the optical axis of the luminous flux of the reflected light from the optical disk and are located in such a position that a light spot formed by the first luminous flux branch of the reflected light from the optical information recording medium layer targeted for recording or playback will be focused on the boundary line, and the boundary line used to extract the first luminous flux branch in the luminous flux extracting unit is located at a distance d from a diametrical axis which includes the optical axis of the luminous flux in the luminous flux extracting unit so that the first luminous flux branch of reflected light from the layers other than the optical information recording medium layer targeted for recording or playback forms a light spot in such a position on the photodetection unit as not to overlap the first light spot.

2. The optical head according to claim 1, wherein the signal output resulting from the light spot formed by the first luminous flux branch of the reflected light from the optical information recording medium layer targeted for recording or playback is the same between the first and second photodetection areas.

3. The optical head according to claim 1, wherein
the luminous flux extracting unit extracts a second luminous flux branch or a plurality of second luminous flux branches including the optical axis of the luminous flux other than the first luminous flux branch from the luminous flux of the reflected light from the optical disk; and
the photodetection unit does not receive the second luminous flux branch or branches.

4. The optical head according to claim 3, wherein
the luminous flux extracting unit has a first transparent surface and a second transparent surface divided by a straight line located at a distance d (d>0) from a diametrical axis which includes the optical axis of the reflected light from the optical disk;
the first luminous flux branch is produced by passage through the first transparent surface; and
the second luminous flux branch or branches are produced by passage through the second transparent surface.

5. The optical head according to claim 4, wherein the distance d satisfies:

$$d \leq (0.5 \times (D/2))$$ (Formula 1)

where D is flux diameter of reflected light which enters the luminous flux extracting unit.

6. The optical head according to claim 3, further comprising a sub-photodetection unit which receives the second luminous flux branch or branches, wherein
a tracking error signal is generated based on signal output from the sub-photodetection unit.

7. The optical head according to claim 3, wherein the luminous flux extracting unit has a diffractive element.

8. The optical head according to claim 3, wherein the luminous flux extracting unit has a prism.

9. The optical head according to claim 1, wherein light-receiving areas of the first photodetection area and the second photodetection area are not equal in size.

10. The optical head according to claim 1, wherein a focus error signal is generated based on a difference in signal output between the first photodetection area and the second photodetection area.

11. The optical head according to claim 1, wherein the number of optical information recording medium layers of the optical disk is three or more.

12. The optical head according to claim 1, wherein interlayer distance among the plurality of optical information recording medium layers is 40 μm or less.

13. The optical head according to claim 1, wherein interlayer distance among the plurality of optical information recording medium layers is 25 μm or less and wavelength of the light source is 408 nm.

14. The optical head according to claim 1, wherein the luminous flux extracting unit has a knife edge.

15. An optical information processing apparatus comprising:
an optical head which optically records and plays back information on/from an optical disk;
a rotation unit which rotationally drives the optical disk; and
a control unit which controls the optical head; wherein
the optical head is the optical head according to claim 1.

16. A control method for an optical head, comprising:
a condensing step of collecting light from a light source and directing the light onto an optical disk which has a plurality of optical information recording medium layers;
a luminous flux extracting step of extracting, from a luminous flux of reflected light from the optical disk, at least a first luminous flux branch which does not include the optical axis of the luminous flux; and
a photodetection step of receiving the reflected light from the optical disk and producing signal output,
wherein the photodetection step includes a first and second photodetection steps of receiving the first luminous flux branch of reflected light from an optical information recording medium layer targeted for recording or playback out of the plurality of optical information recording medium layers of the optical disk, and
the first and second photodetection steps operate, by dividing areas by a boundary line which includes an intersecting point of intersecting with the optical axis of the luminous flux of the reflected light from the optical disk, in such a position that a light spot formed by the first luminous flux branch of the reflected light from the optical information recording medium layer targeted for recording or playback will be focused on the boundary line.

17. The control method for an optical head according to claim 16, wherein the light spot formed on the photodetection unit by the first luminous flux branch of the reflected light from the optical information recording medium layer targeted for recording or playback does not overlap each other a light spot formed on the photodetection unit by the first luminous flux branch of reflected light from the layers other than the optical information recording medium layer targeted for recording or playback.

* * * * *